United States Patent
Leytem

Patent Number: 6,092,757
Date of Patent: Jul. 25, 2000

[54] TOWEL DISPENSER FOR TRACTOR

[76] Inventor: John Leytem, 2956 320th St., Hopkinton, Iowa 52237

[21] Appl. No.: 09/318,294

[22] Filed: May 25, 1999

[51] Int. Cl.[7] .................................................. B65H 16/02
[52] U.S. Cl. ..................... 242/593; 242/596.8; 242/400; 242/403; 242/404.3; 242/406; 206/409
[58] Field of Search ................ 242/593, 588.6, 242/596, 596.8, 403, 400, 404.3, 406; 206/409

[56] References Cited

U.S. PATENT DOCUMENTS

| | | | |
|---|---|---|---|
| 1,479,960 | 1/1924 | Flynn | 242/588.6 X |
| 3,721,395 | 3/1973 | Snipes | 242/596.8 |
| 4,244,493 | 1/1981 | Harrison | 206/409 X |
| 4,262,816 | 4/1981 | Margulies | 206/409 X |
| 4,958,733 | 9/1990 | Masuda | 206/409 |
| 5,078,330 | 1/1992 | Hall | 242/403 X |
| 5,207,367 | 5/1993 | Dunn et al. | 206/409 X |
| 5,467,893 | 11/1995 | Landis, II et al. | 206/409 X |
| 5,533,621 | 7/1996 | Schoal, Jr. | 206/409 |
| 5,601,190 | 2/1997 | Weber | 206/409 X |
| 5,715,971 | 2/1998 | Morand | 242/593 X |
| 5,765,718 | 6/1998 | Grasso et al. | 242/593 X |

*Primary Examiner*—Donald P. Walsh
*Assistant Examiner*—Minh-Chau Pham
*Attorney, Agent, or Firm*—Allan L. Harms

[57] ABSTRACT

A disposable towel dispenser for mounting to the exterior of a tractor or other vehicle having hydraulic couplers mounted to its exterior. The dispenser is a vertical housing of generally cylindrical shape which has a top cap which is easily removed for insertion of a roll of disposable towels within the housing. The roll of disposable towels rests on an internal platform which has a central opening from which disposable towels may be drawn downward from the center of the roll. The housing is equipped with a protruding bracket on one side which can be slid into a receiving bracket mounted on the tractor provided for mounting of a standard slow moving vehicle sign. The housing may have a receiving bracket mounted to its exterior on the opposite side from the protruding bracket for mounting of a slow moving vehicle sign to the dispenser.

18 Claims, 6 Drawing Sheets

TOWEL DISPENSER FOR TRACTOR

BACKGROUND OF THE INVENTION

In the operation of a farm tractor, it is necessary to couple and decouple hydraulic fittings which are carried on the tractor body with hydraulic hoses which are carried on the frames or bodies of farm implements. Due to the nature of hydraulic fluid carried in the hydraulic lines and through the couplings, residue of hydraulic fluid is deposited on the hydraulic fittings and this residue collects dust and dirt, creating a grimy coating on the fittings. However, these hydraulic fittings must be kept clean so that contamination of the hydraulic fluid system of the tractor does not occur. Usually, a tractor operator must carry or locate a cloth rag or paper towel to wipe the couplers clean before a coupling is made. Sometimes the operator will use his own clothing as a wiping cloth, which leads to carrying additional grime into the tractor cab or the farmhouse.

Some tractors are delivered with caps for covering of the couplers, but these can be lost, are ineffectual and inconvenient and wiping with rags or towels is still necessary. Furthermore, many implements are not provided with such caps and the couplings to the hydraulic lines of these tools must be kept clean as well. What is needed therefore is an efficient, inexpensive solution to provide readily available wiping cloths to clean hydraulic couplings as needed.

SUMMARY OF THE INVENTION

The present invention provides a towel dispenser which may be mounted to a tractor in a position from which paper towels may be obtained expeditiously when needed to wipe off dirt and grime from hydraulic couplers on the tractor and on implements to be attached to the tractor. The preferred embodiment provides a vertical housing of generally cylindrical shape which has a top cap with internal threading which is easily removed for insertion of a roll of disposable towels within the housing. The roll of disposable towels rests on an internal platform which has a central opening from which disposable towels may be drawn downward from the center of the roll. The platform is spaced upward from the lower end of the housing in order to reduce the exposure to dust of the protruding end of the next towel to be dispensed. The housing is equipped with a protruding bracket on one side which can be slid into a receiving bracket mounted on the tractor provided for mounting of a standard slow moving vehicle sign. The housing has a receiving bracket mounted to its exterior on the opposite side from the protruding bracket. The receiving bracket on the housing is of the type used to receive the protruding bracket of a slow moving vehicle sign and thus the slow moving vehicle sign may be attached to the dispenser housing without interfering with the usefulness of the dispenser and without the installation of a second receiving bracket on the tractor body. By mounting the dispenser in place of the existing slow moving vehicle sign, the dispenser is stationed at a useful place at the rear of the tractor while the slow moving vehicle sign may remain in the same relative position after it is attached to the exterior of the dispenser.

Alternative embodiments may include a housing with a slotted membrane covering the lower end of the housing or alternatively, the platform on which the roll of disposable towels rests may be provided with a central region of flexible plastic with a plurality of intersecting slots in its center to provide an opening through which towels may be drawn.

The dispenser may also be oriented in a horizontal fashion for mounting to the rear of the tractor and the housing may be of rectangular rather than cylindrical shape.

The dispenser may also be mounted to the sides of combines or other self-propelled or drawn farm equipment to provide a supply of disposable towels for use in cleaning grease zerks and fittings of various kinds. Also, the dispenser may be mounted to any self-propelled machine or vehicle for which a need to clean surfaces or fittings may exist.

It is an object of the invention to provide a dispenser of disposable towels which may be mounted to a tractor near hydraulic fittings mounted thereon.

It is also an object of the invention to provide a paper towel dispenser which may be easily mounted in place of a slow moving vehicle sign and which may have a slow moving vehicle sign mounted to the dispenser.

It is a further object of the invention to provide an inexpensive supply of disposal towels efficiently available for use with farm machinery.

It is a further object of the invention to provide a disposable towel dispenser for mounting to self-propelled farm or construction machines.

The foregoing and other objects will be understood from examination of the description which follows.

DETAILED DESCRIPTION OF THE INVENTION

Figure 1:
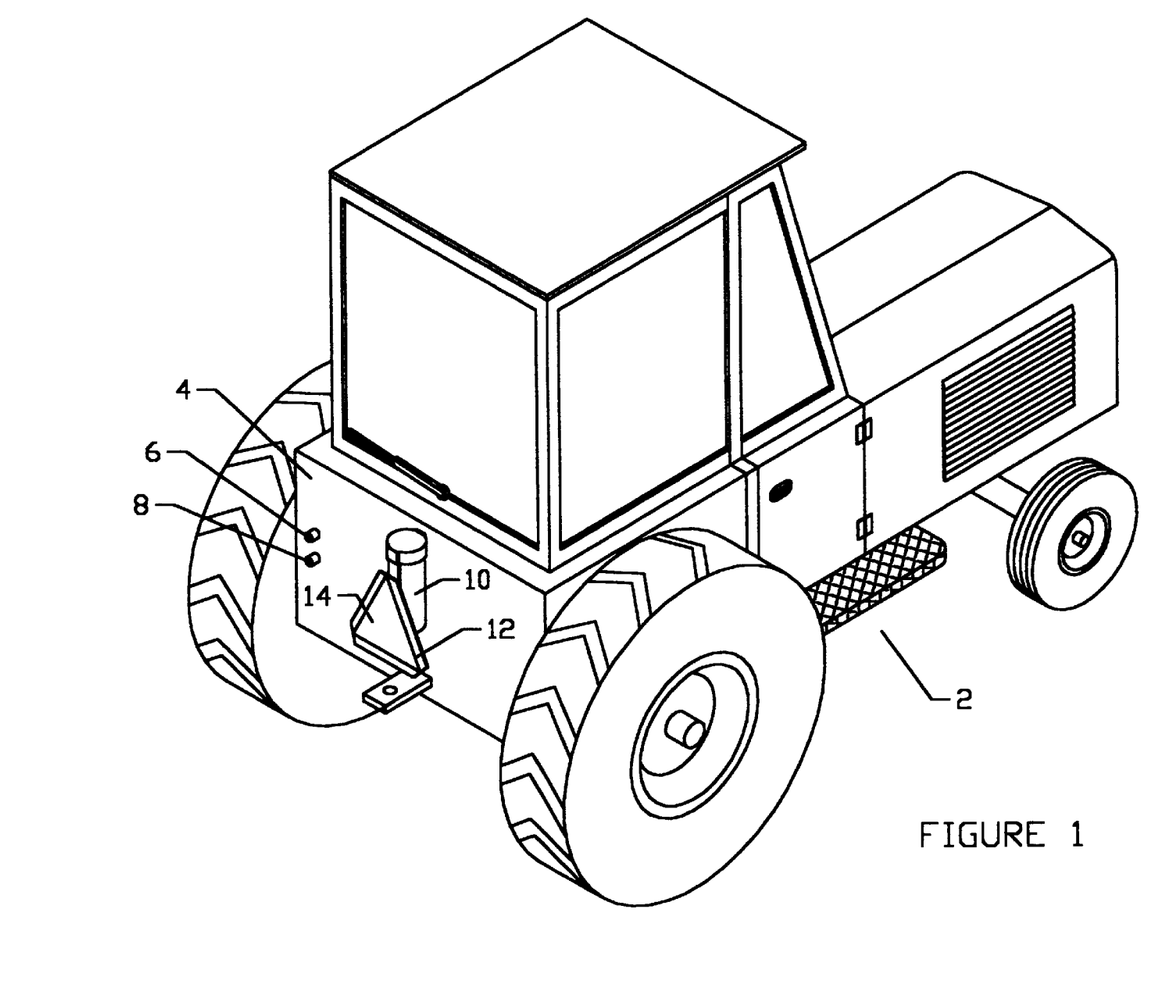
FIG. 1 is a perspective of a farm tractor equipped with the preferred embodiment of the invention dispenser which has a slow moving vehicle sign attached to the invention which is shown in dashed lines.

FIG. 1 illustrates a farm tractor 2 having a rear end 4 upon which are mounted hydraulic couplers 6, 8. Invention dispenser 10 is retained to rear end 4 of tractor 2 and has slow moving vehicle sign 12 mounted thereto. Dispenser 10 is vertically oriented and is preferably detachably mounted to the rear end 4 of the tractor 2 by bracket means or by hook and loop fasteners or by satisfactory fasteners. However, dispenser 10 may be fixedly mounted to rear end 4 of tractor 2 if ease of removal of dispenser 10 is not desired. Slow moving vehicle sign 12 is of the ordinary required type comprising a triangular plate painted orange on its information face 14 and visible from behind tractor 2. Typical installation of this type of slow moving sign 12 comprises a protruding bracket which is slidably receivable in a receiving bracket mounted to rear end 4 of tractor 2 or another slow moving vehicle. In the preferred embodiment installation illustrated in FIG. 1, dispenser 10 is provided with a receiving bracket for receiving the protruding bracket of slow moving vehicle sign 12. Dispenser 10 is preferably disposed at the rear end 4 of tractor 2 due to its proximity to hydraulic fittings 6, 8 which are mounted upon or near rear end 4 of tractor 2. Therefore, disposable towels may be withdrawn from dispenser 10 to be used to wipe grime and dirt from fittings 6, 8 before couplings of other hydraulic components are made to fittings 6, 8. It should be understood that dispenser 10 can efficiently be employed with other farm and construction machines and other self-propelled vehicles on which an available supply of disposable towels would be useful to clean fittings, wipe grease zerks, clean pneumatic couplers, or clean windshields.

Figure 2:
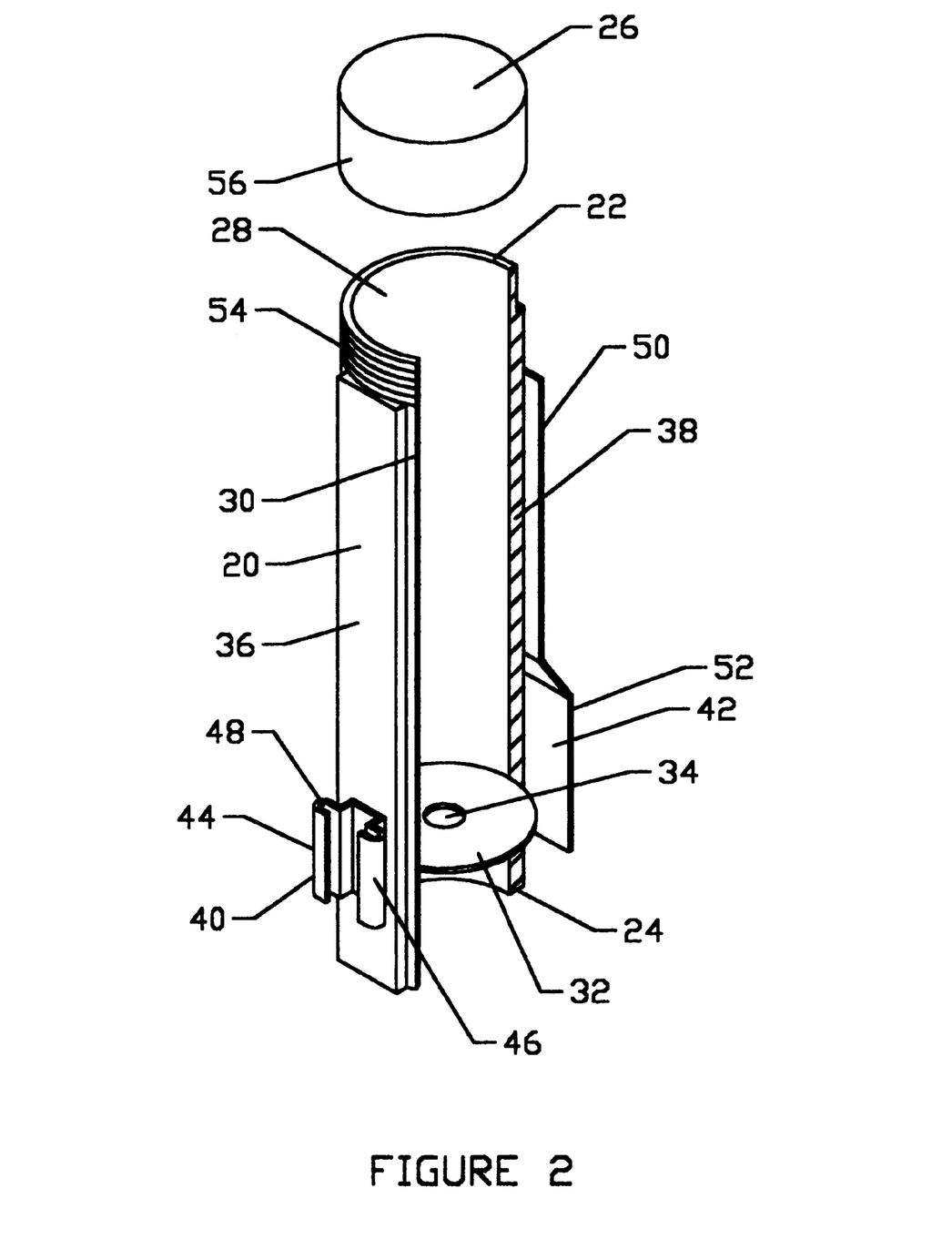
FIG. 2 is a perspective view of the preferred embodiment dispenser with part of the housing sidewall cut away and with the cap displaced from the upper end of the housing of the dispenser.
Figure 3:
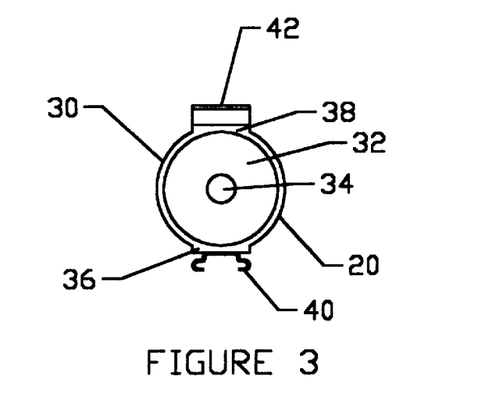
FIG. 3 is a bottom plan view of the preferred embodiment of FIG. 2.

Referring now to FIGS. 2 and 3, the preferred embodiment dispenser 10 may be seen to include a housing 20 which is preferably cylindrical and hollow, having a top end 22 and a bottom end 24 and cylinder sidewall 30. The inside diameter of housing 20 is sized to receive a typical household roll of disposable towels. Preferably the diameter of housing 20 is four to six inches so that ordinary rolls of household paper towels may be inserted with little sidewall interference. Removal of the usual cardboard tube from the roll of paper towels is best accomplished before the roll is inserted through insertion opening 28.

A cap 26 is selectively attachable to top end 22 to cover insertion opening 28 of the top end 22 of housing 20. Within housing 20 and spaced apart from its bottom end 24 is platform 32 which is circular to conform to the interior of housing 20 and to provide a support on which a roll of paper or other disposable towels may rest such that the roll is coaxial with housing 20.

Centrally within platform 32 is a dispensing opening 34 which is preferably round and of substantially smaller diameter than that of housing 20. In practice it is found that dispensing opening 34 is preferably approximately one-half to two inches in diameter, preferably approximately one inch in diameter. By making dispensing opening 34 this small, towels being drawn through dispensing opening 34 will encounter frictional resistance and will slightly resist being pulled from the dispensing opening. Since household paper towels are typically separated by perforations, an individual towel may be torn from the next succeeding towel by a sharp pull after the next succeeding towel has entered dispensing opening 34.

Housing 20 includes first rib 36 and second rib 38 diametrically opposingly mounted to the outside surface of sidewall 30. Since the thickness of sidewall 30 may be quite small, ribs 36, 38 impart structural rigidity to housing 20 and provide bases on which receiving bracket 40 and protruding bracket 42 may be mounted. Receiving bracket 40 is fixed to first rib 36 of housing 20 and comprises opposing channels 44, 46 which define a receiving slot 48 into which a blade of a complementary mounting bracket may be vertically inserted. Such a complementary mounting bracket is protruding bracket 42 which is mounted to second rib 38 diametrically opposing receiving bracket 40.

Protruding bracket 42 comprises an upper end 50 fixed touchingly to rib 38 and a blade 52 which is spaced apart from and generally parallel to second rib 38. Protruding bracket 42 is a typical steel bracket used for mounting slow moving vehicle signs to vehicles while receiving bracket 40 is typically mounted to the bodies of slow moving vehicles to receive the protruding bracket mounted to the usual slow moving vehicle sign in current use.

The top end 22 of housing 20 is provided with external threading 54 which may mate with internal threading within neck 56 of cap 26 such that cap 26 may screw mount to housing 20 and be selectively removable.

Figure 4:
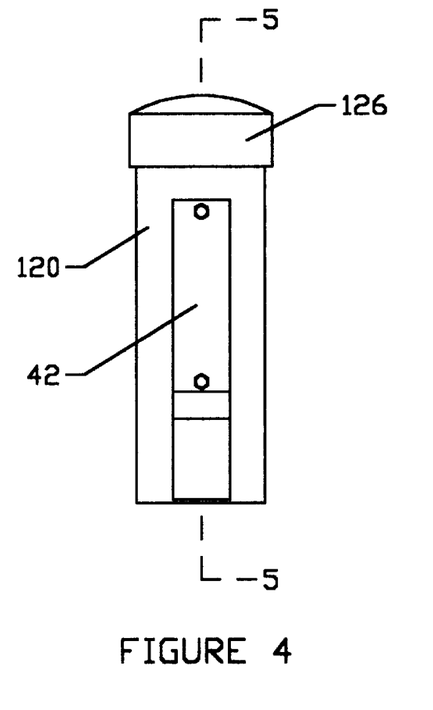
FIG. 4 is a front elevation of an alternate embodiment of the invention.
Figure 5:
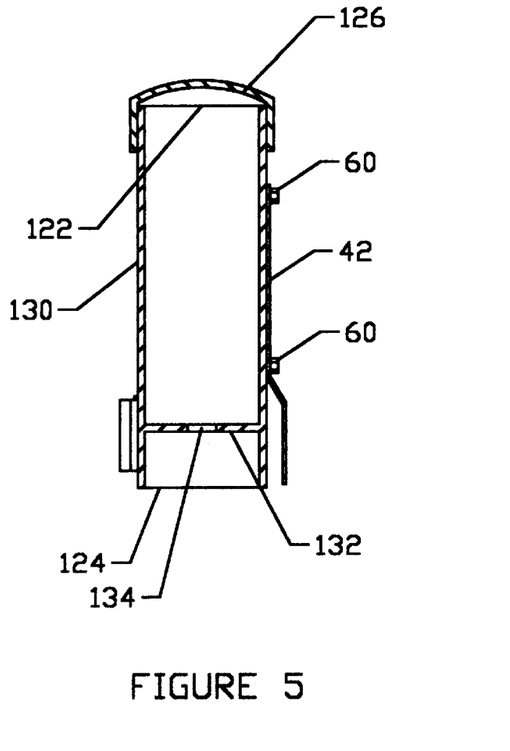
FIG. 5 is a cross section of the alternate embodiment of FIG. 4 taken along line 5—5 of FIG. 4.

FIGS. 4 and 5 illustrate an alternate embodiment of the dispenser invention wherein a cylindrical tube 120 serves as a housing and has a relatively thick sidewall 130. Cylindrical tube 120 may be a length of molded plastic pipe having a diameter of at least four inches. A lid 126 may be employed to be frictionally retained to the top end 122 of cylindrical tube 120. The same type of receiving bracket 40 and protruding bracket 42 as used in the preferred embodiment of FIGS. 1–3 may be fastened by screws 60 to the cylinder tube 130. A disk 132 is fastened to inside of cylindrical tube 120, spaced apart from bottom end 124, at approximately two inches therefrom. A dispensing opening 134 is centrally located in disk 132 which may be of suitable materials, including plastic sheet.

Figure 6:
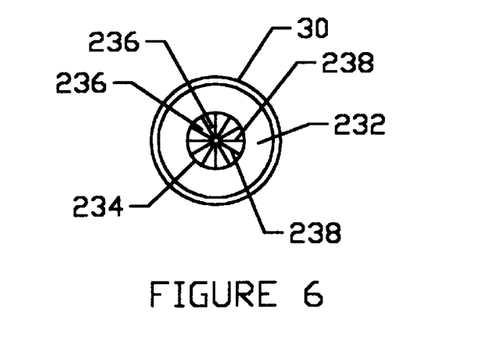
FIG. 6 is a bottom plan view of another embodiment of the invention having a segmented flexible dispensing opening.

FIG. 6 illustrates an alternative to the platform 32 of FIG. 2 or of the disk 132 of FIG. 5 wherein floor 232 may be fixed transversely to the axis of cylindrical sidewall 30. Floor 232 will support a roll of disposable towels within housing 20 and is provided with a central region 234 which comprises a multiplicity of fingers 236 made by a plurality of diametric intersecting slits 238 all having a coincident intersection point. Disposable towels drawn through opening 234 will be restrained by fingers 236.

Figure 7:
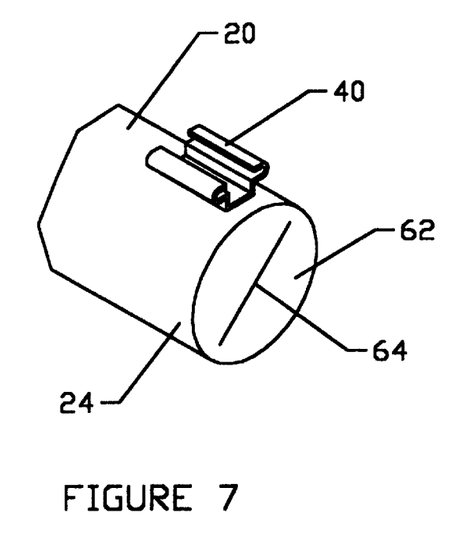
FIG. 7 is a perspective view of the bottom segment of another alternate embodiment of the invention with a slotted membrane covering its bottom end.

FIG. 7 illustrates the bottom end 24 of the housing 20 of FIG. 2 provided with an optional overlying flexible membrane 62 having a transverse slit 64 therein. Membrane 62 is preferably a resilient thin walled rubber-like sheet such that slit 64 may be easily opened by insertion of a finger therethrough. The addition of membrane 62 to housing 20 helps prevent contamination of a towel end which has been partly drawn through dispensing opening 34 of platform 32.

Figure 8:
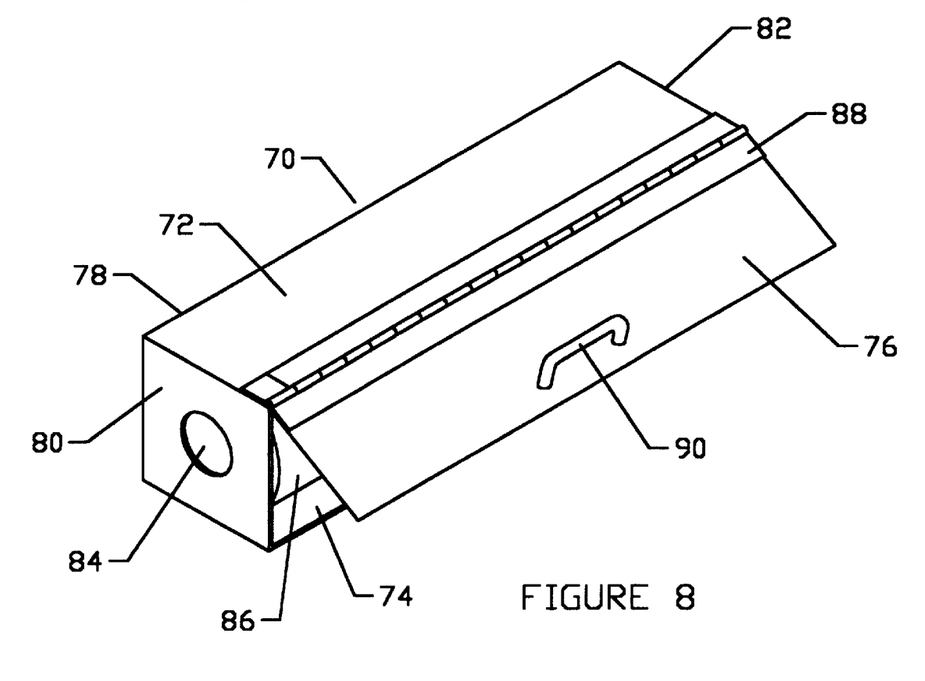
FIG. 8 is a perspective of another alternate embodiment disposable towel dispenser which may be mounted in a horizontal orientation to a tractor or other farm machine.

FIG. 8 discloses another embodiment of the invention wherein an enclosure 70 includes horizontally disposed top wall 72, opposing bottom wall 74, door 76, rear wall 78 and end walls 80, 82. Inwardly directed circular bosses 84 are formed on each of end walls 80, 82 and are sized to be received in the ends of a typically household roll 86 of paper towels, the length of enclosure 70 being only slightly longer than the roll 86 of paper towels. Hinge 88 allows door 76 to be swung outward and upward to provide an entry opening for the roll 86 of paper towels and also door 76 may be slightly opened to permit an individual towel to be drawn from the outside of roll 86. A handle 90 is provided to facilitate the opening of door 76. Enclosure 70 may be fixed by mounting wall 78 by screws, adhesives, rivets or other suitable fastenings to the outerwall of the tractor or enclosure 70 may be selectively retained to the tractor or other hydraulic system equipped device by brackets or hook and loop fasteners or equivalent well known means.

Figure 9:
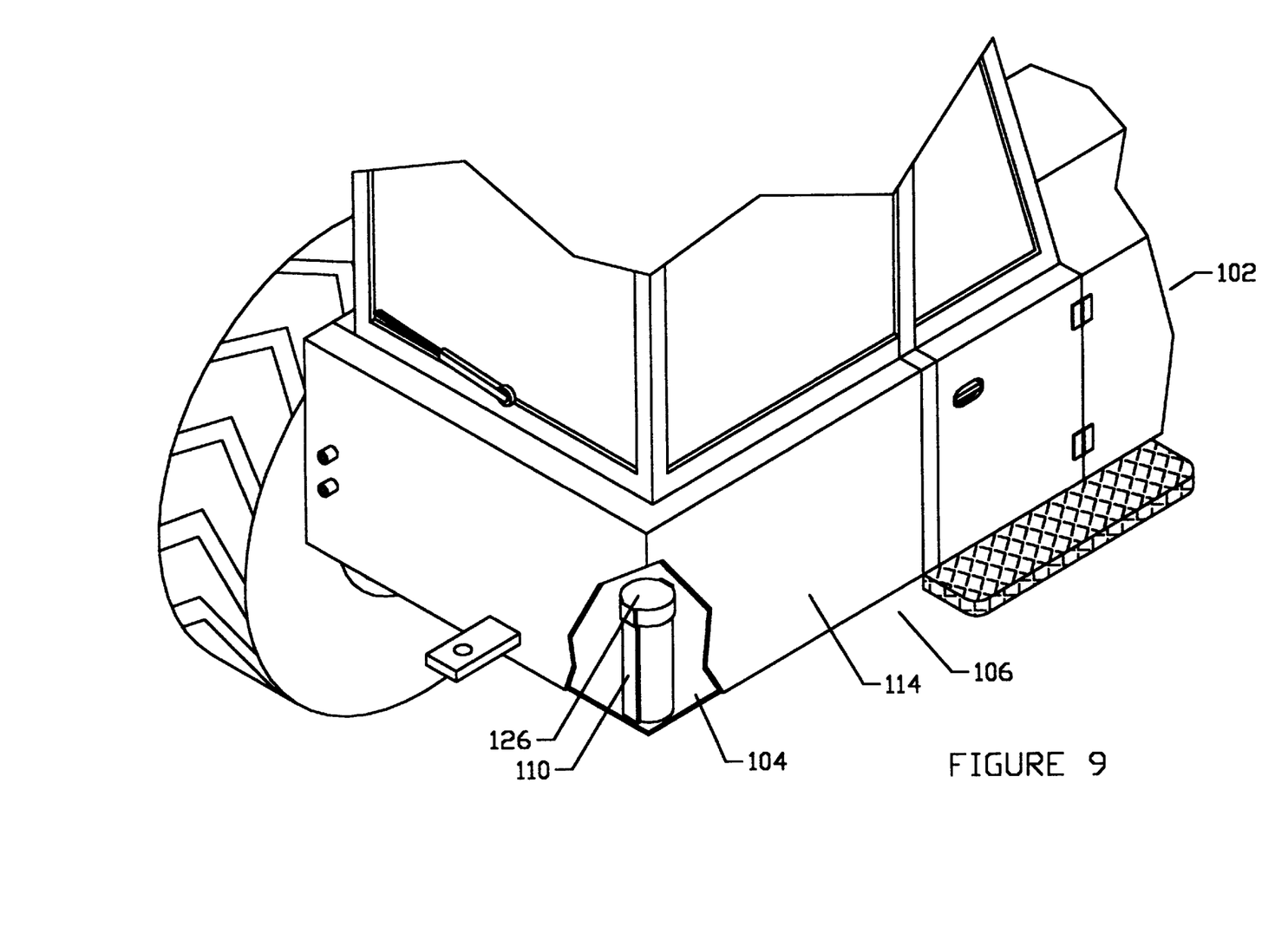
FIG. 9 is a partly cut away perspective view of a tractor cab having a towel dispenser mounted within the cab compartment of the tractor.

FIG. 9 discloses another alternative embodiment of the invention wherein a vertically oriented dispenser 110 may be supported on the floor 104 within the cab 106 of a tractor 102. It is to be understood that floor 112 overhangs a vacant space in the area of dispenser 110 and an opening may be provided in floor 104 under dispenser 110 such that a user standing exterior to the cab 106 may reach upwardly into dispenser 110 to draw individual disposable towels from a roll disposed within dispenser 110. The dispensing opening may be enclosable by a trap door or other cover. A user present within cab 106 may remove cover 126 to insert a roll within dispenser 110. It is anticipated that the manufacturer of cabs for farm tractors and other self-propelled machines would mold dispenser 110 into the interior fixtures of the cab 106, leaving a portal to the cab exterior for allowing access to single towels.

Figure 10:
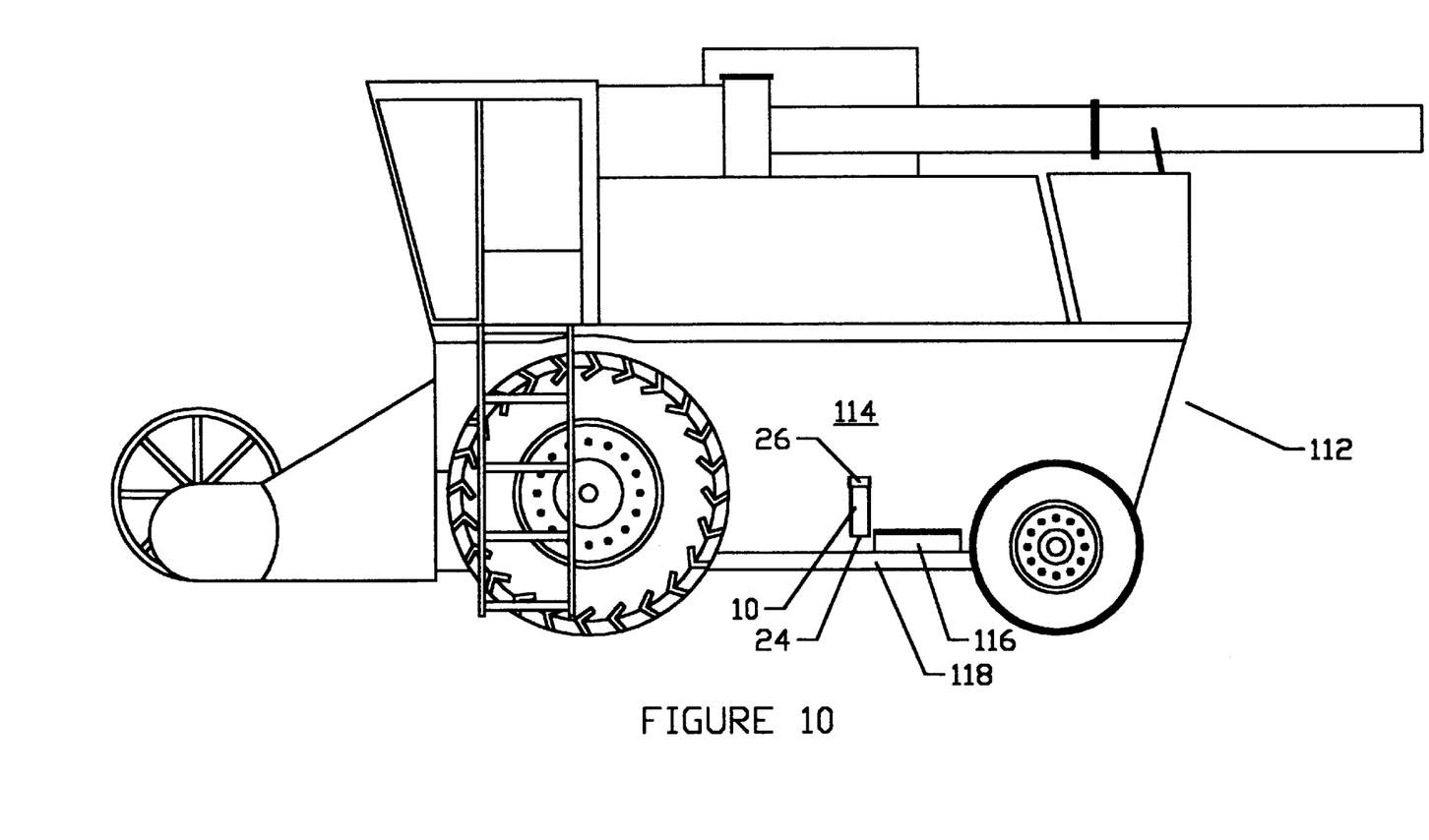
FIG. 10 is a front elevation of a combine having the preferred embodiment dispenser mounted thereto.

FIG. 10 discloses a self propelled farm combine 112 having one of preferred embodiment dispenser 10 mounted thereto. Dispenser 10 may be mounted to the vertical sidewall 114 of combine 112 to provide a supply of disposable towels for use in wiping grease zerks and hydraulic fittings located on the combine 112 which should be cleaned to prevent the introduction of

What is claimed is:

1. A paper towel dispenser for a tractor comprising
a vertically oriented, generally cylindrical housing having a top and a bottom and a sidewall,
said housing of curvilinear cross section,
a cap selectively closing said top of said housing,
a platform mounted within said housing spaced apart from said bottom of said housing,
said platform nearer said bottom than said top of said housing,
said platform having a centrally disposed opening therein,
first mounting means on said housing to mount said housing to said tractor.

2. The dispenser of claim 1 wherein
said bottom has a flexible cover thereover,
said flexible cover is provided a slit therein,
whereby a user may spread said slit to obtain access to said dispensing opening.

3. The dispenser of claim 1 wherein
said first mounting means comprises a first bracket mounted to said sidewall of said housing and a complementary receiving bracket for mounting to said tractor,
said first bracket interlockable with said complementary receiving bracket.

4. The dispenser of claim 3 wherein
a second bracket is mounted to said sidewall diametrically opposing said first bracket,
said second bracket capable of interlocking engagement with a slow moving vehicle sign mounting bracket,
whereby a slow moving vehicle sign may be mounted to said second bracket.

5. The dispenser of claim 4 wherein
said second bracket is substantially identical to said complementary receiving bracket.

6. The dispenser of claim 1 wherein
second mounting means is mounted to said sidewall diametrically opposing said mounting means,
said second mounting means engageable with a slow moving vehicle sign whereby a slow moving vehicle sign may be mounted to said second mounting means.

7. The dispenser of claim 1 wherein
said sidewall is provided with at least one rib longitudinally extending therealong,
said first mounting means mounted to said at least one rib.

8. The dispenser of claim 7 wherein
second mounting means is mounted to said sidewall diametrically opposing said mounting means,
said second mounting means engageable with a slow moving vehicle sign whereby a slow moving vehicle sign may be mounted to said second mounting means.

9. The dispenser of claim 1 wherein
said sidewall is provided with a first rib longitudinally mounted thereto,
said first mounting means mounted to said first rib of said housing,
said first mounting means comprises a first bracket mounted to said sidewall of said housing and a complementary receiving bracket for mounting to said tractor,
said first bracket interlockable with said complementary receiving bracket,
said housing has a second rib longitudinally mounted thereto,
said second rib diametrically opposing said first rib,
a second bracket is mounted to said second rib of said sidewall diametrically opposing said first bracket,
said second bracket capable of interlocking engagement with a slow moving vehicle sign mounting bracket,
whereby a slow moving vehicle sign may be mounted to said second bracket,
said centrally disposed opening of said platform being of diameter of approximately one half to two inches.

10. A dispenser for disposable towels for a machine having hydraulic couplings thereon comprising
an elongate housing sized to receive a roll of disposable towels therein,
said housing comprises a vertically oriented hollow cylinder,
said housing having a top and a bottom,
each of said top and said bottom being open,
said top comprising an opening in said housing through which the roll of disposable towels may be inserted in said housing,
said top having a selectively attachable cover thereon,
said cylinder having a platform therein on which said roll of disposable towels may rest,
said platform spaced apart from said bottom of said housing,
said platform having a dispensing opening therein through which single towels of said roll of disposable towels may be drawn,
a mounting to retain said housing to said machine.

11. The dispenser of claim 10 wherein
said mounting comprises a protruding elongate bracket fixed to said housing and a complementary receiving bracket mountable to said machine,
whereby said protruding bracket is slidably receivable within said receiving bracket.

12. The dispenser of claim 11 wherein
said protruding bracket includes a blade spaced from said housing,
said receiving bracket comprises spaced apart opposing channels sized to slidingly receive said blade.

13. The dispenser of claim 10 wherein
said bottom has a flexible membrane thereon covering said open bottom,
said flexible membrane is provided with at least one slit therein,
whereby a user may spread said at least one slit to obtain access to said dispensing opening.

14. The dispenser of claim 10 wherein
said dispensing opening of said platform comprises a central region of said platform, said central region having a plurality of intersecting slits, each of said slits intersecting at a common point.

15. The dispenser of claim 10 wherein
said mounting comprises a first interlocking element fixed to said housing and a complementary interlocking element for attachment to said machine.

16. The dispenser of claim 10 wherein
a second mounting is disposed on said housing diametrically opposed to said mounting.

17. The dispenser of claim 10 wherein
said dispensing opening is of diameter of approximately one half to two inches.

18. A paper towel dispenser for a self-propelled machine having a slow moving sign receiving bracket mounted thereto comprising a vertically oriented, generally cylindrical housing having an open top and an open bottom and a sidewall, a cap selectively closing said top of said housing, a platform mounted within said housing spaced apart from said bottom of said housing, said platform disposed near said bottom of said housing, said platform having a centrally disposed opening therein, a first bracket member mounted to said sidewall of said housing, said first bracket member receivable in said receiving bracket of said self-propelled machine.

* * * * *